United States Patent
Pflibsen et al.

Patent Number: 5,335,070
Date of Patent: Aug. 2, 1994

[54] LASER LIGHT BEAM HOMOGENIZER AND IMAGING LIDAR SYSTEM INCORPORATING SAME

[75] Inventors: Kent P. Pflibsen; Albert N. Stuppi, both of Tucson, Ariz.

[73] Assignee: Kaman Aerospace Corporation, Bloomfield, Conn.

[21] Appl. No.: 96,923

[22] Filed: Sep. 14, 1993

Related U.S. Application Data

[62] Division of Ser. No. 750,572, Aug. 27, 1991, Pat. No. 5,303,084.

[51] Int. Cl.$^5$ .......................... H04N 7/18; G01C 3/08
[52] U.S. Cl. .......................... 348/31; 342/55; 356/5; 250/332; 359/599; 348/216; 348/147
[58] Field of Search .......... 358/95, 211, 109, 93; 342/55; 356/5; 250/332; 359/599

[56] References Cited

U.S. PATENT DOCUMENTS

| | | |
|---|---|---|
| 3,076,377 | 2/1963 | Brownscombe . |
| 3,170,980 | 5/1962 | Pritchard . |
| 3,476,463 | 11/1969 | Kreuzer . |
| 4,195,913 | 1/1980 | Dourte et al. . |
| 4,327,972 | 5/1982 | Brunsting . |
| 4,744,615 | 5/1988 | Fan et al. . |
| 4,862,257 | 7/1988 | Ulrich . |
| 5,054,869 | 11/1991 | Doyle . |
| 5,109,465 | 4/1992 | Klopotek . |
| 5,231,401 | 7/1993 | Kaman et al. ............... 342/55 |

FOREIGN PATENT DOCUMENTS

| | | |
|---|---|---|
| 0121069 | 10/1984 | European Pat. Off. . |
| 2578691 | 3/1985 | France . |
| 60-150025 | 12/1985 | Japan . |
| 9000138 | 9/1990 | PCT Int'l Appl. . |
| 9003449 | 7/1990 | United Kingdom . |

OTHER PUBLICATIONS

European Search Report P-DSF-206/OEB.

Primary Examiner—Jon W. Henry
Attorney, Agent, or Firm—Fishman, Dionne & Cantor

[57] ABSTRACT

A new and improved laser light beam homogenizer for transforming a laser beam with spatially inhomogeneous intensity into a beam with a more nearly spatially uniform intensity pattern is presented. The light beam is diverged by a lens and presented to an integrator. The integrator transforms the beam into a beam with a more uniform illumination. The uniform illumination beam is then impinged on control optics to limit the divergence of the uniform beam and control higher order distortion in the system. This beam may then be illuminated at a predetermined distance by a projecting optic lens. The laser light beam homogenizer of this invention is particularly well suited for use in an imaging lidar system.

16 Claims, 4 Drawing Sheets

LASER LIGHT BEAM HOMOGENIZER AND IMAGING LIDAR SYSTEM INCORPORATING SAME

This is a divisional of copending application(s) Ser. No. 07/750,572 filed on Aug. 27, 1991, now U.S. Pat. No. 5,303,084.

BACKGROUND OF THE INVENTION

This invention relates generally to a device for projecting reshaping a beam of radiation and an imaging lidar system incorporating this device. More particularly, this invention relates to a new and improved laser light beam homogenizer which transforms a laser beam with spatially inhomogeneous intensity into a beam with a more nearly spatially uniform intensity pattern.

There is currently a need for discrete devices which expand, reshape and project beams of radiation. An example of an application which may require such a device is the imaging lidar system disclosed in U.S. Pat. No. 4,862,257 (assigned to the assignee hereof and incorporated herein by reference) wherein a pulsed light source (laser) projects typically circular pulses of light at a target in a backscattering medium with the reflected light pulses being detected by one or more gated cameras. In certain situations, it may be advantageous to reshape the pulsed light from the original circular cross-section shape to another configuration, generally rectangular or square. This need is particularly important in the imaging lidar system described in U.S. patent application Ser. No. 565,631 filed Aug. 10, 1990, now U.S. Pat. No. 5,231,401 which is also assigned to the assignee hereof and incorporated herein by reference. Presently, it is difficult to effectively and accurately expand, reshape and project radiation beams such as laser beams.

Laser beam homogenizers are well known in the art. For example, U.S. Pat. No. 4,744,615 to Fan et al (all of the contents of which are incorporated herein by reference). discloses a laser beam homogenizer employing a light tunnel and is described below. As is well known, in order for a light tunnel to have a reasonable geometry (i.e., dimensions), the input laser beam to the light tunnel should have a significant beam divergence angle (herein defined as the angle between the most divergent marginal ray in the light tunnel and the beam axis). In accordance with the laser beam homogenizer of U.S. Pat. No. 4,744,615, a lens focuses a laser beam onto a focal point S, which defines a focal plane perpendicular to the optical axis of the laser beam and thereby creates a diverging laser beam with a significant beam divergence angle $\theta$. The light tunnel receives most of the diverging laser light.

The entrance of the light tunnel is a square aperture which limits the entering light to a square cross-section and defines the marginal rays of the light in the tunnel. The length L of the tunnel is defined herein for purposes of illustration as a length extending all the way to the focal plane, even when the physical length of the tunnel is less. This is done because a tunnel extending all the way to the focal plane is optically equivalent to a tunnel which extends forward toward the source even farther; or one which does not extend even to the focal plane, so long as the marginal rays in the light tunnel are not changed thereby.

The beam divergence angle $\theta$ is defined as the angle between the axis and the most divergent marginal ray in the light tunnel. Actually, there is a most divergent marginal ray with respect to each of the reflective sides of the tunnel. With a square tunnel coaxial with the axis, the most divergent marginal ray striking each reflective side of the tunnel strikes the inside front edge of each side at the midpoint of the reflective side, and the beam divergence angle is the same with respect to each of the sides.

The light tunnel has a length and width such that the diverging laser light portion reflected from the top side and the diverging laser light portion reflected from the bottom side each exactly fills the exit face of the light tunnel. A central portion of the diverging laser light passes through the tunnel without any reflection, while the peripheral portions are reflected.

Since the rays in each of the reflected portions of the light are still diverging after reflection, the reflected rays may be extended backwards to define virtual focal points or virtual light sources. Actually, two additional virtual focal points or sources are formed by the light which is reflected once from the left and right sides of the light tunnel; and four additional virtual focal points or sources are formed by the light which makes a reflection from each of two adjacent sides of each of the four corners of the tunnel.

SUMMARY OF INVENTION

The present invention relates to a laser light beam homogenizer and an imaging lidar system incorporating this laser light beam homogenizer. In accordance with the light beam homogenizer of the present invention, a light beam is focused with an injection optics lens to produce a beam with a significant divergence angle. This beam is presented to an integrator which produce a beam at its exit aperture which has a more uniform illumination and corresponds to the shape of the exit aperture. The uniform illumination beam impinges on control optics which limit the divergence of the uniform beam. The exit aperture is then imaged by projection optics and may be used in a variety of optics applications and finds particular utility in imaging lidar systems such as described in aforementioned U.S. Ser. No. 565,631.

Also, in accordance with the present invention, multiple light sources may be employed to increase total optical power throughout; or to allow multiple wavelengths (i.e., colors of light) to be projected. In accordance with still another feature of the present invention, the integrator may comprise movable sides having internal reflective surfaces such that the aspect ratio of the illuminated beam can be adjusted accordingly.

The present invention employs injection optics which provide for a shorter overall system length than that of the prior art. Further, the control optics of the present invention may employ slower and less expensive projection optics, or alternatively may employ light sources with higher peak powers than that of the prior art by providing control of the size, location, and shape of beam waists occurring near the projection optics.

The above-discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
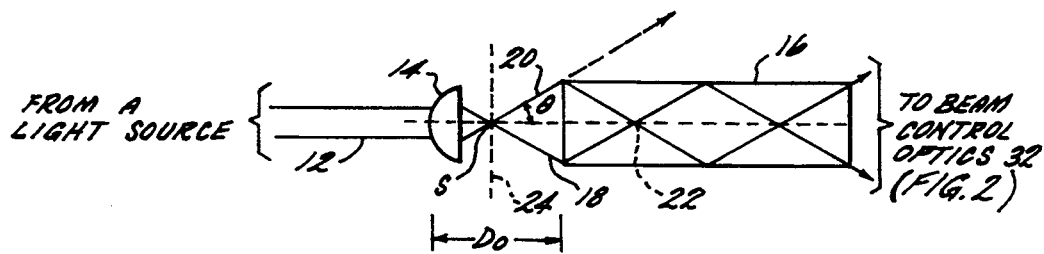
FIG. 1 is a partial schematic view of a laser beam homogenizer in accordance with an embodiment of the present invention.

Referring now to FIG. 1, a laser light beam homogenizer which transforms a laser beam with spatially inhomogeneous intensity into a more nearly spatially uniform intensity pattern is shown generally at 10. In accordance with laser beam homogenizer 10, an incoming light beam 12 which originates from a laser (not shown) and which diverges very little (i.e., the angle between the marginal rays in the beam and the axis of the beam is very small) is focused by an injection optics lens 14. Beam 12 is preferably a round collimated laser beam with a divergence angle near zero. The light is then focussed through lens 14 to a light tunnel 16. However, in order for light tunnel 16 (i.e., an integrator) to have a reasonable geometry (i.e., sufficiently sized dimensions for practical applications), an input beam 18 to light tunnel 16 should have a significant beam divergence angle $\theta$ (herein defined as the angle between the most divergent marginal ray 20 in light tunnel 16 and the beam axis 22). Lens 14 may be a plano-convex lens as shown in FIG. 1 or a bi-convex lens which focuses beam 12 onto a focal point S, in order to provide input beam 18 with beam divergent angle $\theta$. A focal plane 24 defined by focal point S is perpendicular to the optical axis 22 of beam 12. Diverging beam 18 is created at focal point S and has a significant beam divergence angle (i.e., angle $\theta$).

Figure 2:
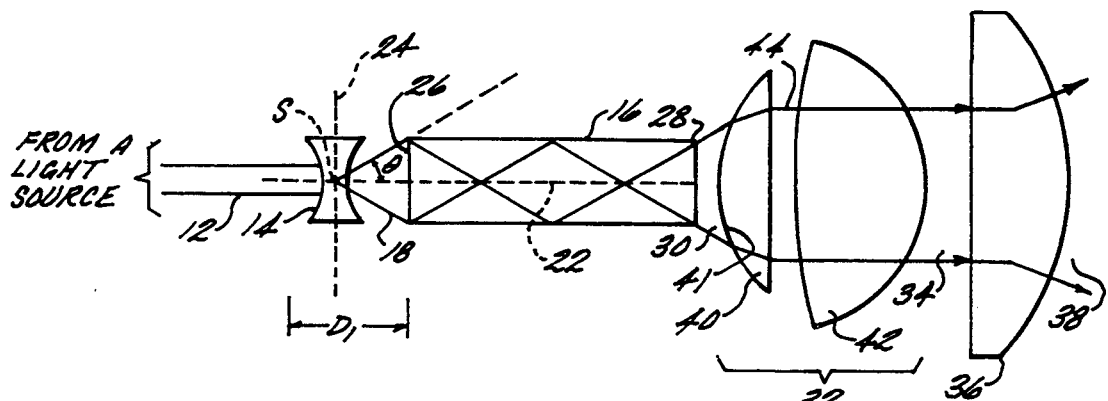
FIG. 2 is a schematic view of the laser beam homogenizer in accordance with another embodiment of the present invention.

Although lens 14 is shown in FIG. 1 as a plano-convex lens and is suitable for providing an input beam 18, it is preferred that the overall length of the system be reduced. Referring now to FIG. 2, lens 14 is shown as a hi-concave lens (or a double plano-concave lens). A hi-concave lens 14 is preferred because the distance $D_1$, from lens 14 to integrator 16 is substantially less than the distance $D_0$ (FIG. 1), from the plano-convex lens 14 to integrator 16, thereby reducing the overall length of the system. It will be appreciated that the same input beam 18 with divergence angle $\theta$ is achieved without any degradation in performance. A plano concave lens may also be employed for lens 14, although the hi-concave lens is preferred.

Integrator 16 (i.e., a light tunnel) receives, for purposes of illustration, all of diverging beam 18 at an input aperture 26. Since all of beam 18 is received, no source intensity is lost due to vignetting by integrator 16 (i.e., a reduction in intensity of illumination near the edges of integrator 16 at aperture 26 caused by obstruction of light rays from beam 18 at the edges of aperture 26). Aperture 26 serves as a beam limiting aperture so that the far field illumination pattern is controlled by an acceptance angle of aperture 26. The acceptance angle is equivalent to divergence angle $\theta$ since, in this illustration, all of beam 18 is received by aperture 26. The dimensions of integrator 16 are determined by requiring a sufficient number of reflections in the light tunnel to attain the desired uniformity at the exit aperture.

Integrator 16 internally reflects beam 18 to provide a more uniform illumination beam at output aperture 28 of integrator 16. An output beam 30 (being generally uniform and diverging) is impinged on a beam control optics lens 32. Optics 32 decreases the output divergence angle of beam 30 at exit aperture 28 of integrator 16. A controlled beam 34 exiting from optics 32 is imaged on a projection optics lens 36. Lens 36 is employed to direct a projected beam 38 emanating from lens 36. Beam 38 is generally directed at an object or surface for a variety of applications. One such application is an imaging lidar system such as described in U.S. Pat. No. 4,862,257, U.S. Ser. No. 565,631 and the imaging lidar system of FIG. 7.

It is well known from the prior art light tunnels of U.S. Pat. No. 4,744,615, that a plurality of virtual focal points or sources are formed by the light reflected from the internal walls of the light tunnel. It is also known from the prior art that the number of virtual focal points or sources can be varied by changing the length L of light tunnel 16. The length L of light tunnel 16 is defined, as described hereinbefore, as a length extending all the way to the focal plane 24, even when the physical length of tunnel 16 is less. Therefore, at the output aperture 28 of integrator 16, the uniform illumination beam 30 is produced.

In accordance with the present invention, control optics 32 are positioned at the exit aperture 28 of integrator 16 to reduce the divergence of beam 30 exiting integrator 16. Control optics 32 comprises a plano-convex lens 40 positioned such that the convex surface 41 of lens 40 receives beam 30. Lens 42 receives a less diverging beam 44 from lens 40. Lens 42 is added to control distortion of the light tunnel exit aperture image projected by lens 36. Thus, while the prior art described in U.S. Pat. No. 4,744,615 produced a uniform beam at the exit of a light tunnel (i.e., integrator 22) no efforts were made to limit the divergence of the beam 28. Thus, without control optics 32 projection optic 36 was required to be comprised of relatively fast high quality optics. This requirement for high quality optics leads to significant high cost and maintenance expense. This problem is reduced in the present invention by the lenses 40 and 42 which decrease the divergence angle of beam 30 exiting integrator 16. A less divergent beam (i.e., beam 34) is now imaged on the projection optics 36 as opposed to the prior art wherein a more divergent beam would have been imaged on lens 36. Further, optics 32 may comprise anamorphic beam forming optics in order to further modify the wavefront of beam 30 exiting integrator 16 so as to reduce the problems of air breakdown in the beam. The anamorphic beam forming optics reduce the radiance at any intermediate beam circumference.

It will be appreciated that beam 30 at the output aperture 28 of integrator 16 will appear uniform, but on a microscopic level the beam will be highly non uniform due to interference affects. These interference affects arise due to the coherent properties of the laser (i.e., the light source for beam 12). This micro-structure is generally not a concern unless the imaging system used in conjunction with the present invention has a resolution enabling this micro-structure to be seen. In most remote sensing applications, this is usually not the case e.g., generally this micro-structure is averaged out by the imaging system).

The minimum width of channel integrator 16 is selected in order to reduce the overall length of the system 10. The minimum width of integrator 16 is limited by the damage threshold of the coatings used in the channel Integrator 16 and the laser beam diameter. These coatings are both the reflective coatings and anti-reflective coatings. Injection optics 14 are to be chosen such that a minimum of two to three reflections occur for the edge of the diverging beam 18 for typical laser beam intensity distributions. However, other input beam distributions may require more reflections to achieve adequate uniformity of the beam at the output of integrator 16. The uniformity requirements placed on the projected beam as well as the spatial distribution of the input beam 12 determine the number of needed reflections. It will be appreciated that this can be varied by selecting the appropriate length for integrator 16 as is well known in the art and described hereinbefore. It should be noted that increasing the number of reflections will increase the uniformity of the output beam 30 as well as making integrator 16 less alignment sensitive. This will generally reduce overall system throughput. The reflectance of the interior mirrored faces of integrator 16 are a function of incidence angle. After the desired number of reflections is determined, the aspect ratio (length divided by width) of integrator 16, and beam divergence angle can be adjusted so as to maximize the throughput of the system. Large injection angles require the projection optics whose focal length to diameter ratio (F#) is very small (approaching unity). Achieving lower F#'s requires higher quality lenses than a system with a higher F#.

Figure 3:
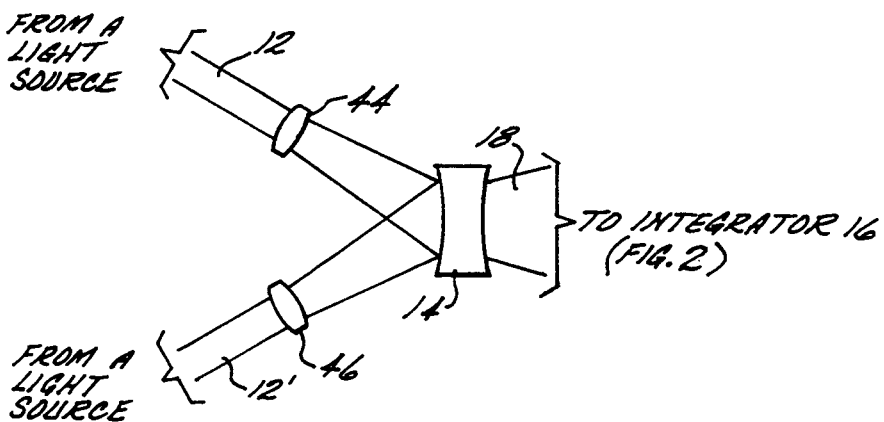
FIG. 3 is a partial schematic view of the laser beam homogenizer of FIG. 2 having multiple light sources.

Although beam 12 is described as a single beam from a single source, beam 12 may be a combination of beams Referring to FIG. 3 two beams 12 and 12', each originating from a separate point source (not shown) are directed by lenses 44 and 46 onto injection optics lens 14. This allows multiple wavelengths (i.e., colors of light) to be projected. Further, increased total optical power throughput may be achieved by the combination of multiple light sources. It will be appreciated that beams 12 and 12' may originate from a single point source and, through an arrangement of beam splitters and reflective optics, may be impinged on lens 14 in an incoherent fashion.

Figure 4:
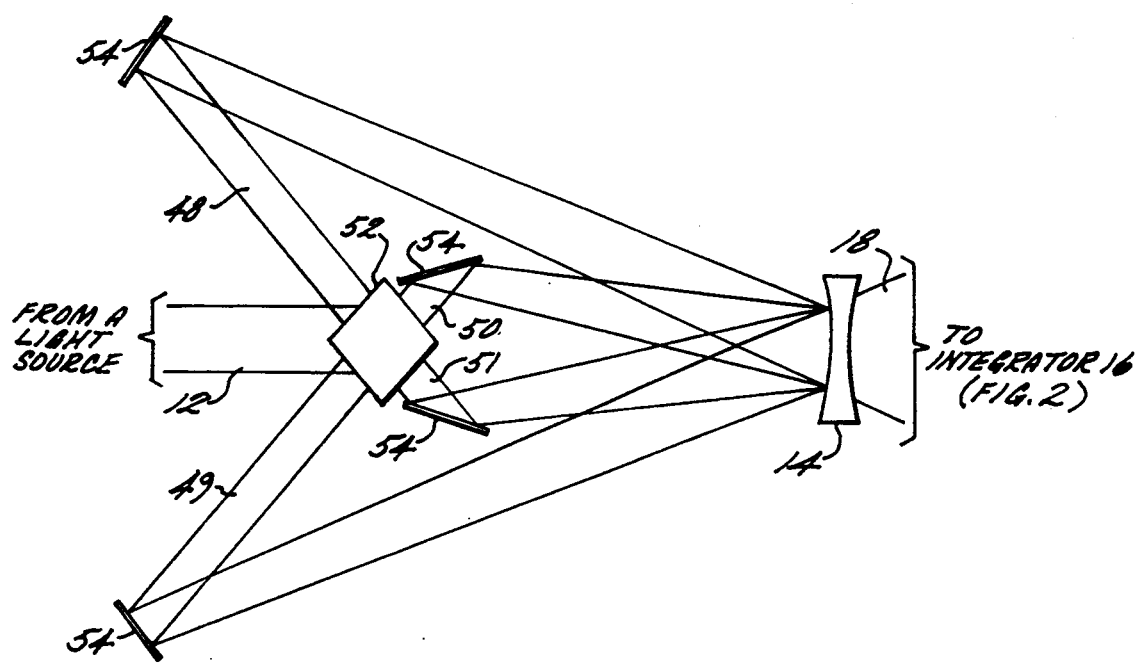
FIG. 4 is a partial schematic view of the laser beam homogenizer of FIG. 2 having both refraction and reflection injection optics.

Referring to FIG. 4, when homogenizing light beams in which the intensity profile forms a ring-like shape, it may be desirable to divide the beam 12 into a plurality of sections (preferably four or more) 48, 49, 50 and 51. This may be accomplished with a pyramidal beam reflector 52 whereby beams 48–51 are directed by mirrors 54 onto lens 14 (FIG. 2). The peak intensity region of each beam 48–51 passes essentially unreflected down the center of integrator 16 with the lower intensity portions reflected from the sides of integrator 16.

Figure 5:
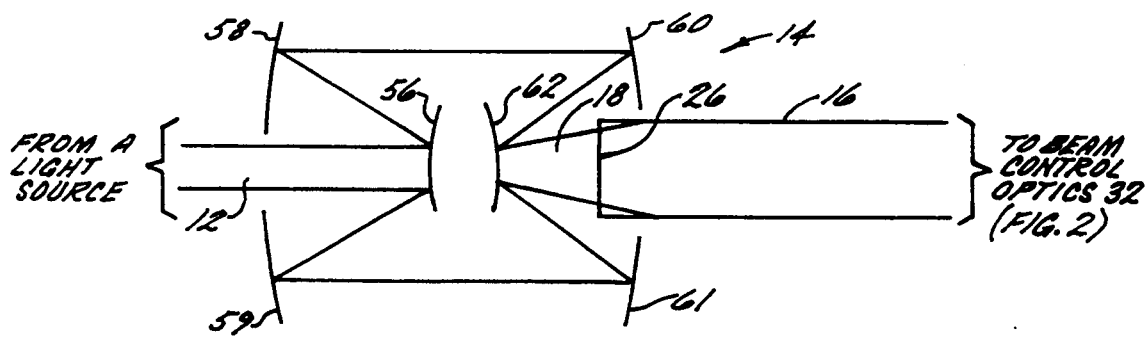
FIG. 5 is a partial schematic view of the laser beam homogenizer of FIG. 2 having reflection injection optics.

Referring to FIG. 5, it may be desirable to preserve the polarization state of the incoming light beam 12. This may be accomplished with still another embodiment of the present invention using axisymmetric reflective optics. In accordance with this axisymmetric reflective optics embodiment, beam 12 is reflected off a first surface 56 onto surfaces 58 and 59 and then directed onto surfaces 60 and 61, respectively. Thereafter, beam 12 is reflected onto surface 62 which images the diverging beam 18 onto aperture 26 of integrator 16. Preferably, at least six axisymmetric reflective optics are used. This may also be accomplished with low birefringence refracting optics as is well known in the art.

Figure 6:
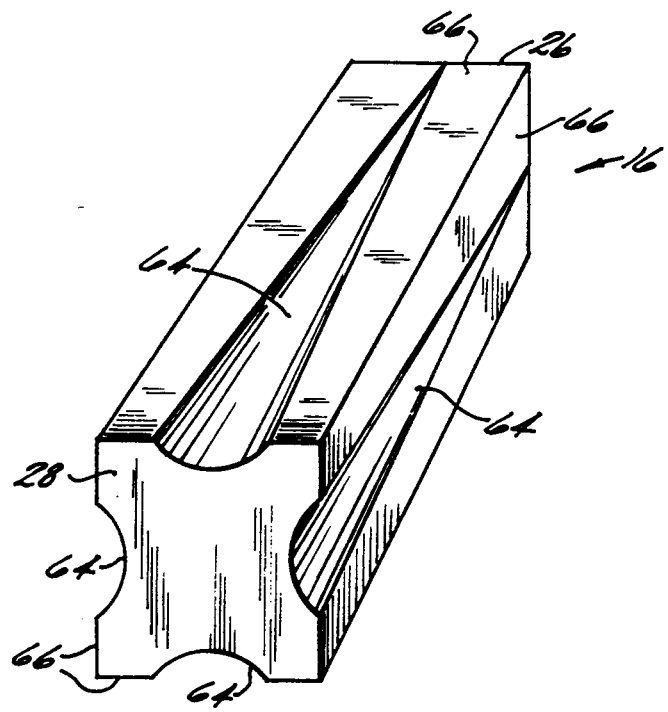
FIG. 6 is a perspective view of an integrator for use in the laser beam homogenizer of FIG. 2 in accordance with an alternate embodiment of the present invention.

Although integrator 16 is shown in FIGS. 1–5 as having plane parallel sides aligned to the optical axis 22, referring to FIG. 6, integrator 16 may also have a curved recess 64 at about the center of in each side 66. Curved recess 64 is tapered from aperture 28 down toward aperture 26. This will allow adjustment of the uniformity of the beam exiting integrator 16.

Figure 8:
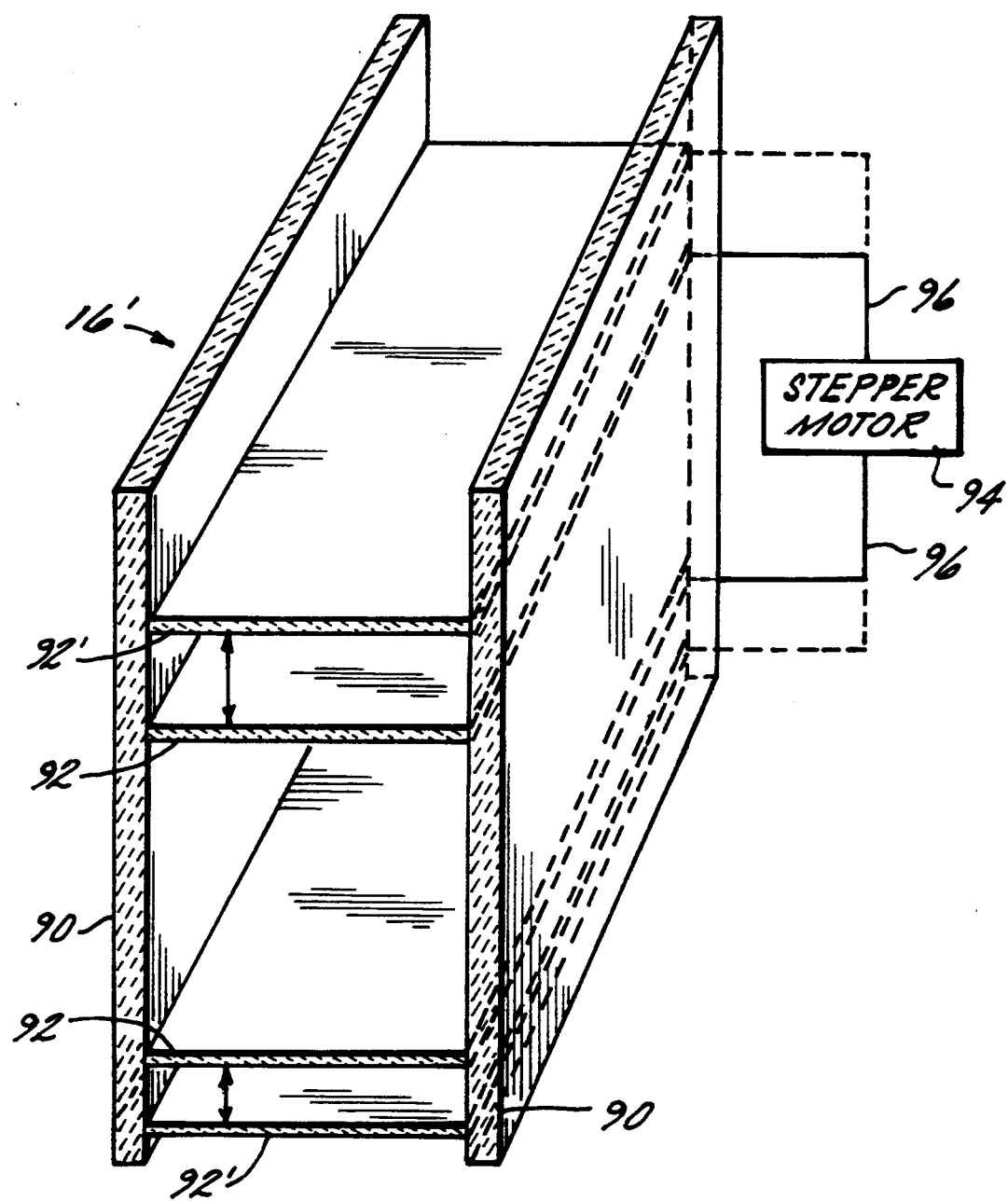
FIG. 8 is a perspective view of an integrator having movable sides in accordance with the present invention.

Integrator 16 may be formed from a single solid glass or crystalline component and coated on its sides with a reflective coating and on its ends with an anti-reflection coating as shown in FIG. 6; or it may be formed from a number (preferably four) of independent mirrors which are joined at their edges or are movable. With movable sides, the aspect ratio of the illuminated beam can be adjusted accordingly. An example of a movable integrator is shown at 16' in FIG. 8. Integrator 16' is comprised of four mirrors including two opposed and relatively long stationary mirrors 90 and two shorter movable mirrors 92. It will be appreciated that mirrors 92 are shown in two positions including a first position at 92 defining a square format and a second position at 92' defining a rectangular format. Of course, mirrors 92 may be moved to any other position so that a desired aspect ratio of the illuminated beam may be adjusted. The movement of mirrors 92 may be accomplished in a variety of manners. For example, mirrors 92 may be actuated by lead screws 94 driven by one or more stepper motors 96 as shown schematically in FIG. 8.

Figure 7:
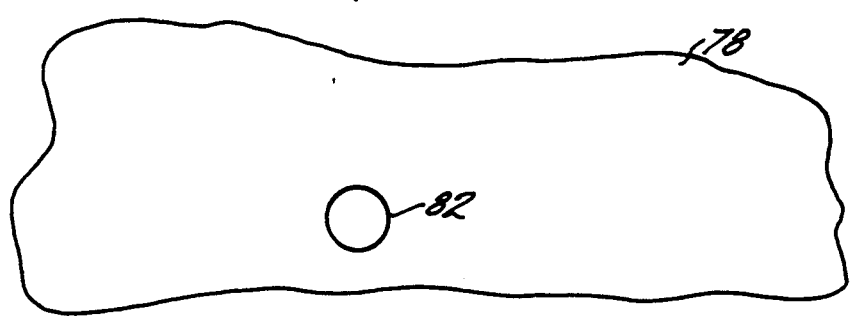
FIG. 7 is a diagram of an imaging lidar system incorporating the laser beam homogenizer of the present invention.

Referring now to FIG. 7 and in accordance with an important application of the present invention, the laser light beam homogenizer as described in any of the embodiments of FIGS. 1–6 is shown at 70 having been incorporated into an imaging lidar system 72. Lidar system 72 may comprise any of the known imaging lidar systems such as described in U.S. Pat. No. 4,862,257. However, preferably, lidar system 72 is of the type described in U.S. application Ser. No. 565,631 with the laser light beam homogenizer 70 being used in replacement of the beam projectors (identified at 64 and 66 in FIG. 4 of U.S. Ser. No. 565,631). In accordance with the well known operation of an imaging lidar system 72, a pulsed light source (laser) 74 emits a brief intense illuminating pulse of light with enters laser light beam homogenizer 70 and exits at 76 towards a backscattering medium 78 upon receiving a signal from timing electronics 80 (e.g., a timing generator). It will be appreciated that the small diameter laser beams emitted by laser 74 will be converted by homogenizer 70 from a nonuniform intensity distribution of a typically round beam into a uniformly bright rectangular beam. After a time delay corresponding to the round trip propagation time of the light traveling from laser 74 to an object 82 in backscattering medium 78 and back up again to the imaging system 72, a second timing signal is sent from timing generator 80 to a range gated camera 84. Upon receipt of this signal, camera 84 opens a shutter for a brief period whereby reflection or backscattered images of target 82 are formed at the camera output. These reflective images are then viewed on a CRT 86.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. An apparatus for detecting and imaging an object at least partially enveloped by a backscattering medium which is at least partially transmitting to light comprising:

light pulse generating means for selectively generating short pulses of light;

light projection means for receiving said pulses of light from said light pulse generating means and transforming the cross-section of said light pulse from a first shape to a preselected second shape;

projecting means for projecting said short pulses of light toward the backscattering medium and at an object enveloped by the medium;

camera means for detecting said pulses of light reflected back from said object after a time delay corresponding to the round-trip propagation time of said light pulses to and from said object; and converting means for converting said detected pulses of light to a video image of said object;

said light projection means comprising;

diverging means for diverging a light beam with spatially inhomogeneous intensity, said light having a coherence length $L_C$, said diverging means providing a diverging light beam;

integrator means having a first aperture for receiving said diverging light beam and having a plurality of internally reflective surfaces for forming an array of apparent light sources, the light from each apparent source in said array being superposed by said integrator means at a second aperture thereof, each individual light ray from each apparent source following a distinct light path to said second aperture to provide a uniform illumination beam;

minimum path length difference means for providing a minimum path length difference between the individual path lengths of any two rays coincident at said second aperture and arising from adjacent apparent sources in said array, said minimum path length difference means being at least said coherence length $L_C$ of said beam;

control optics means for receiving said uniform illumination beam, said control optics means reducing the divergence of said uniform illumination beam and providing a controlled beam; and projection optics means for projecting an image of the integrator to the desired distance.

2. An apparatus for detecting and imaging an object at least partially enveloped by a backscattering medium which is at least partially transmitting to light comprising:

light pulse generating means for selectively generating short pulses of light;

light projection means for receiving said pulses of light from said light pulse generating means and transforming the cross-section of said light pulse from a first shape to a preselected second shape;

projecting means for projecting said short pulses of light toward the backscattering medium and at an object enveloped by the medium;

camera means for detecting said pulses of light reflected back from said object after a time delay corresponding to the round-trip propagation time of said light pulses to and from said object; and converting means for converting said detected pulses of light to a video image of said object;

said light projection means comprising;

diverging means for diverging a light beam with spatially inhomogeneous intensity, said light beam having a coherence length $L_C$, said diverging means providing a diverging light beam;

integrator means having a first aperture for receiving said diverging light beam and having a plurality of movable internally reflective surfaces for forming an array of apparent light sources, the light from each apparent source in said array being superposed by said integrator means at a second aperture thereof, each individual light ray from each apparent source following a distinct light path to said second aperture to provide a uniform illumination beam;

means for moving said movable internally reflective surface to control the aspect ratio of said uniform illumination beam; and minimum path length difference means for providing a minimum path length difference between the individual path lengths of any two rays coincident at said second aperture and arising from adjacent apparent sources in said array, said minimum path length difference means being at least said coherence length $L_C$ of said light beam.

3. An apparatus for detecting and imaging an object at least partially enveloped by a backscattering medium which is at least partially transmitting to light comprising:

light pulse generating means for selectively generating short pulses of light;

light projection means for receiving said pulses of light from said light pulse generating means and transforming the cross-section of said light pulse from a first shape to a preselected second shape;

projecting means for projecting said short pulses of light toward the backscattering medium and at an object enveloped by the medium;

camera means for detecting said pulses of light reflected back from said object after a time delay corresponding to the round-trip propagation time of said light pulses to and from said object; and converting means for converting said detected pulses of light to a video image of said object;

said light projection means comprising;

diverging means for diverging a light beam with spatially inhomogeneous intensity, said light having a coherence length $L_C$, said diverging means providing a diverging light beam;

integrator means having a first aperture for receiving said diverging light beam and having a plurality of internally reflective surfaces for forming an array of apparent light sources, the light from each apparent source in said array being superposed by said integrator means at a second aperture thereof, each individual light ray from each apparent source following a distinct light path to said second aperture to provide a uniform illumination beam;

control optics means for receiving said uniform illumination beam, said control optics means reducing the divergence of said uniform illumination beam and providing a controlled beam; and projection optics means for projecting an image of the integrator to the desired distance.

4. An apparatus for detecting and imaging an object at least partially enveloped by a backscattering medium which is at least partially transmitting to light comprising:

light pulse generating means for selectively generating short pulses of light;

light projection means for receiving said pulses of light from said light pulse generating means and transforming the cross-section of said light pulse from a first shape to a preselected second shape;

projecting means for projecting said short pulses of light toward the backscattering medium and at an object enveloped by the medium;

camera means for detecting said pulses of light reflected back from said object after a time delay corresponding to the round-trip propagation time of said light pulses to and from said object; and converting means for converting said detected pulses of light to a video image of said object;

said light projection means comprising;

diverging means for diverging a light beam with spatially inhomogeneous intensity, said light beam having a coherence length $L_C$, said diverging means providing a diverging light beam;

integrator means having a first aperture for receiving said diverging light beam and having a plurality of movable internally reflective surfaces for forming an array of apparent light sources, the light from each apparent source in said array being superposed by said integrator means at a second aperture thereof, each individual light ray from each apparent source following a distinct light path to said second aperture to provide a uniform illumination beam; and means for moving said movable internally reflective surface control the aspect ratio of said uniform illumination beam.

5. The laser light beam homogenizer of 1 wherein said diverging means comprises:

a positive lens being positioned at a distanced from said first aperture of said integrator means, whereby said light beam converges to a focal point and then diverges so that substantially all of the extreme rays of said diverging light beam are received by said first aperture.

6. The laser light beam homogenizer of claim 1 wherein said diverging means comprises:

a bi-concave lens being positioned at a distance from said first aperture of said integrator means, whereby said light beam diverges so that substantially all of extreme rays of said diverging light beam are received by said first aperture.

7. The laser light homogenizer of claim 1 further comprising:

at least one of said plurality of internally reflective surfaces being a movable internally reflective surface; and means for moving said movable internally reflective surface to control the aspect ratio of said uniform illumination beam.

8. The laser light beam homogenizer of claim 1 further comprising:

pyramidal beam reflector means for dividing said light beam into a plurality of divided beams and directing said plurality of divided beams onto said diverging means.

9. The laser light beam homogenizer of claim 8 wherein said pyramidal beam reflector means comprises:

a pyramidal optical prism having a plurality of optical surfaces, each of said optical surfaces providing one of said divided beams; and a plurality of reflective optics with each of said reflective optics having a reflective surface, each of said reflective surfaces directing one of said divided beams onto said diverging means.

10. The laser light beam homogenizer of claim 1 wherein said diverging means further comprises:

means for preserving the polarization state of said light beam in said diverging light beam.

11. The laser light beam homogenizer of claim 10 wherein said preserving means comprises:

at least two curved and at least four flat reflective optic devices positioned for preserving the polarization state of said light beam in said diverging light beam with one of said reflecting optic devices receiving said light beam and one of said reflective optic devices being positioned at a selected distance from said first aperture of said integrator means, wherein said light beam diverges so that substantially all of the extreme rays of said diverging light beam are received by said first aperture.

12. The laser light beam homogenizer of claim 2, wherein said integrator means includes an optical axis longitudinally therethrough and wherein:

said internally reflective surfaces are parallel to said optical axis and to each other to provide a uniformly sized cross section.

13. The laser light beam homogenizer of claim 12, wherein said internally reflective surfaces are flat.

14. The laser light beam homogenizer of claim 13, wherein each of said flat internally reflective surfaces having a curved recess at about the center thereof, said curved recess being tapered from said second aperture toward said first aperture.

15. The laser light beam homogenizer of claim 12, wherein said integrator means comprises at least four internally reflective surfaces.

16. The laser light beam homogenizer of claim 1 further comprising:

projection optics means for collecting said control beam for illumination at a predetermined distance.

* * * * *